US009684793B2

(12) United States Patent
Schlesinger et al.

(10) Patent No.: US 9,684,793 B2
(45) Date of Patent: Jun. 20, 2017

(54) ENTITLEMENT SECURITY AND CONTROL

(71) Applicant: INTEL CORPORATION, Santa Clara, CA (US)

(72) Inventors: David Schlesinger, Chandler, AZ (US); Timothy Waite, Chandler, AZ (US); Thiru Thangarathinam, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/969,199

(22) Filed: Dec. 15, 2015

(65) Prior Publication Data

US 2016/0188891 A1    Jun. 30, 2016

Related U.S. Application Data

(63) Continuation of application No. 13/769,060, filed on Feb. 15, 2013, now Pat. No. 9,245,094, which is a continuation of application No. 12/168,670, filed on Jul. 7, 2008, now Pat. No. 8,386,388, which is a
(Continued)

(51) Int. Cl.
| | |
|---|---|
| *A63F 13/12* | (2006.01) |
| *G06F 21/62* | (2013.01) |
| *G06Q 20/36* | (2012.01) |
| *G06Q 20/38* | (2012.01) |

(Continued)

(52) U.S. Cl.
CPC ............. *G06F 21/62* (2013.01); *G06F 21/00* (2013.01); *G06F 21/604* (2013.01); *G06F 21/6218* (2013.01); *G06Q 20/3674* (2013.01); *G06Q 20/382* (2013.01)

(58) Field of Classification Search
USPC ...................................... 463/29; 705/51, 80
See application file for complete search history.

(56) References Cited

U.S. PATENT DOCUMENTS

| | | |
|---|---|---|
| 5,999,978 A | 12/1999 | Angal et al. |
| 6,088,451 A | 7/2000 | He et al. |
| 6,381,602 B1 | 4/2002 | Shoroff et al. |
| (Continued) | | |

FOREIGN PATENT DOCUMENTS

JP    2004-188736 A    7/2004

OTHER PUBLICATIONS

Final Office Action received for U.S. Appl. No. 10/390,470, mailed on Jul. 16, 2007, 9 pages.
(Continued)

*Primary Examiner* — Pierre E Elisca
(74) *Attorney, Agent, or Firm* — Barre Law Firm, PLLC

(57) ABSTRACT

A system, apparatus, and method are provided for entitlement security and control. An example method includes granting an entitlement permission after an entitlement request for the computer user has been determined to satisfy one or more predetermined entitlement rules for one or more computer resources of a computing device. Also, an audit trail is generated, comprising information relating to the computer user receiving the entitlement permission. In addition, a change to one or more user characteristics of the computer user in one or more data sources is tracked. The audit trail is automatically updated to reflect the change to the one or more data sources. Other embodiments are described and claimed.

18 Claims, 10 Drawing Sheets

Related U.S. Application Data continuation of application No. 10/390,470, filed on Mar. 17, 2003, now Pat. No. 7,403,925.

(51) Int. Cl.
*G06F 21/00* (2013.01)
*G06F 21/60* (2013.01)

(56) References Cited

U.S. PATENT DOCUMENTS

| | | |
|---|---|---|
| 6,651,056 B2 | 11/2003 | Price et al. |
| 6,745,332 B1 | 6/2004 | Wong et al. |
| 6,938,171 B1 | 8/2005 | Isomichi et al. |
| 7,032,026 B1 | 4/2006 | Biswas et al. |
| 7,054,923 B2 | 5/2006 | Krishnamoorthy |
| 7,231,657 B2 | 6/2007 | Honarvar et al. |
| 7,236,976 B2 | 6/2007 | Breitenbach et al. |
| 7,451,477 B2 | 11/2008 | Griffin et al. |
| 7,549,054 B2 | 6/2009 | Brodie et al. |
| 7,848,976 B2 | 12/2010 | Juarez et al. |
| 2002/0152212 A1 | 10/2002 | Feldman |
| 2002/0188869 A1* | 12/2002 | Patrick ............... G06F 21/6245 726/4 |
| 2003/0084021 A1 | 5/2003 | Dweck et al. |
| 2003/0105974 A1 | 6/2003 | Griffin et al. |
| 2003/0212654 A1 | 11/2003 | Harper et al. |
| 2004/0044895 A1 | 3/2004 | Reasons et al. |
| 2004/0093292 A1* | 5/2004 | Shurygailo ............ G06Q 40/00 705/35 |
| 2004/0162905 A1 | 8/2004 | Griffin et al. |
| 2004/0230917 A1 | 11/2004 | Bales et al. |
| 2005/0086228 A1 | 4/2005 | Gross et al. |
| 2005/0144135 A1* | 6/2005 | Juarez ................... G06Q 30/02 705/51 |
| 2005/0182941 A1 | 8/2005 | Della-Libera et al. |
| 2005/0216421 A1 | 9/2005 | Barry et al. |
| 2006/0041436 A1 | 2/2006 | Brodie et al. |
| 2006/0093292 A1 | 5/2006 | Biegelsen |
| 2008/0270174 A1 | 10/2008 | Schlesinger et al. |
| 2011/0119203 A1 | 5/2011 | Juarez et al. |

OTHER PUBLICATIONS

Final Office Action received for U.S. Appl. No. 10/390,470, mailed on Sep. 26, 2006, 8 pages.
Non-Final Office Action received for U.S. Appl. No. 10/390,470, mailed on Apr. 20, 2006, 9 pages.
Non-Final Office Action received for U.S. Appl. No. 10/390,470, mailed on Feb. 8, 2007, 9 pages.
Non-Final Office Action received for U.S. Appl. No. 10/390,470, mailed on Oct. 16, 2007, 9 pages.
Notice of Allowance received for U.S. Appl. No. 10/390,470, mailed on Mar. 19, 2008, 7 pages.
Final Office Action received for U.S. Appl. No. 12/168,670, mailed on Oct. 18, 2011, 7 pages.
Non-Final Office Action received for U.S. Appl. No. 12/168,670, mailed on Jul. 13, 2011, 7 pages.
Notice of Allowance received for U.S. Appl. No. 12/168,670, mailed on Oct. 19, 2012, 8 pages.
Non-Final Office Action received for U.S. Appl. No. 13/769,060, mailed on Apr. 1, 2015, 8 pages.
Non-Final Office Action received for U.S. Appl. No. 13/769,060, mailed on Jul. 9, 2014, 8 pages.
Notice of Allowance received for U.S. Appl. No. 13/769,060, mailed on Sep. 22, 2015, 8 pages.
netegrity.com, "Access Network Solutions", Website: www.access-networking.com, retrieved on Jul. 21, 2003, 1 page.
netegrity.com, "Netegrity Identity and Access Management", Website: www.netegrity.com, retrieved on Jul. 21, 2003, 1 page.

* cited by examiner

ENTITLEMENT SECURITY AND CONTROL

CLAIM OF PRIORITY

This application is a continuation of U.S. patent application Ser. No. 13/769,060, entitled "Entitlement Security and Control" by David Schlesinger, et al., filed Feb. 15, 2013, now allowed; which is a continuation of U.S. patent application Ser. No. 12/168,670, entitled "Entitlement Security and Control" by David Schlesinger, et al., filed Jul. 7, 2008, now issued as U.S. Pat. No. 8,386,388; which is a continuation of U.S. patent application Ser. No. 10/390,470, entitled "Entitlement Security and Control" by David Schlesinger, et al., filed Mar. 17, 2003, now issued as U.S. Pat. No. 7,403,925, and priority is claimed thereof.

BACKGROUND

Field

Embodiments generally relate to security and control and in particular, to entitlement security and control, using metadata.

Description

Many attempts have been made to secure user access to, for example, an application and to more closely monitor and manage such access. However, methods and apparatus available today fail to separate entitlement from access, and primarily rely on the "access" part of a security system rather than focusing on the "entitlement" part. By focusing primarily on the access part of the security system, the methods and apparatus available today do not provide the level or type of security and protection needed against hackers, terminated employees or other such individuals, groups, or organizations. For example, a hacker typically obtains access to a system (by hacking), but may never obtain entitlement. Similarly, for example, a terminated employee may continue to access the company's email despite having been terminated, i.e., not having entitlement permission.

Furthermore, methods and apparatus available today do not have rules, regulations, or roles at the entitlement level to filter users, customers, or applicants before they are granted access. Such methods and apparatus do not classify data in terms of security, importance, urgency, confidentiality, government, community and organization rules and regulations, and other such matters, and are manual and rely on the expectation that someone or some group within the company is security-aware and can flawlessly filter people when grating access permissions. Additionally, methods and apparatus available today do not use metadata.

Typically, as illustrated in FIG. 1, a user 102 places an access permission request 104 with a company to gain access to a protected application 118. An administrator 106 reviews the request 104, and if the request is granted, the administrator may update an access control list (ACL) 108 with user information. However, many rules, regulations, laws, policies, security classifications, and names are likely to be not updated and consequently, ACL 108 is not likely to be content-aware, security-aware, classified, or fully updated, and, is likely to be unable to perform a real-time, fast, informed, and accurate check of access requests 104. Such process is slow, manual, tedious, labor-intensive, and inaccurate, if various changes are not quickly adopted or known, and is based on out-of-date information. Upon reviewing, the user 102 is either rejected 112 or accepted 114. If approved, the user's 102 name and/or other designations are placed in the ACL 108 and the user 102 may access a protected application 118.

Examples of access-based security and control systems include Access360 by International Business Machines (IBM), RAFC, which is a mainframe access control system, Windows Active Directory, by Microsoft Corporation, is an access control or management system which is known to coordinate Windows access control lists. Other examples included Discretionary Access Control (DAC) account permissions, Mandatory Access Control (MAC) system, Role-Based Access Control (RBAC), which is no more than a pre-packed form of MAC, and a Lattice-Based Access Control (LBAC), which is a combination of RBAC and DAC.

None of the methods or apparatus available today is entitlement-based, metadata driven, security-aware, dynamically updated, or fully automated. Methods and apparatus available today do not provide real-time review of user requests or tracking events or keeping of an audit trail. Furthermore, methods and apparatus available today fail to provide an entitlement-based, metadata driven, security-aware, dynamically updated, or fully automated way of removing access, since there may not be a way of remembering or knowing why the entitlement and access were granted in the first place.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Figure 1:
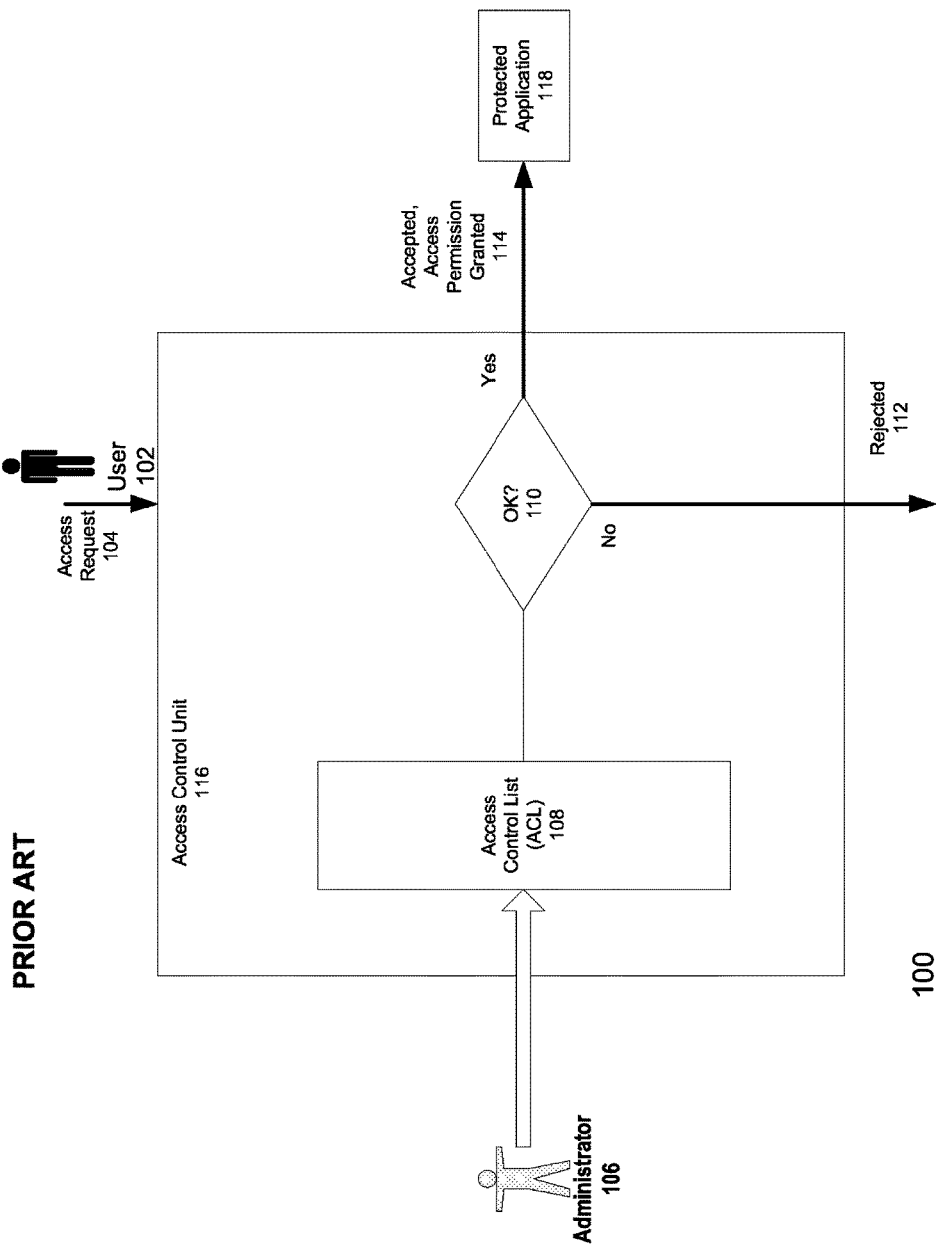
FIG. 1 is a block diagram illustrating a prior art security system.

A method and apparatus are described for a security and control system (SCS) having an entitlement security and control system (ESCS) using metadata. Broadly stated, embodiments of the present invention allow a security and control system to use the metadata driven ESCS to review user entitlement requests seeking entitlement permission, and to grant (or reject) the entitlement permission before forwarding such information to an appropriate access control system.

A system, apparatus, and method are provided for reviewing entitlement requests using entitlement rules and entitlement roles. According to one embodiment, the reviewing process is metadata driven. The entitlement rules may be compiled by receiving information regarding rules, regulations, laws, and policies from various sources. The entitlement roles may be compiled based on the entitlement rules, entitlement requests, entitlement profiles, predetermined criteria, or a combination thereof. Entitlement rules and entitlement roles may be kept dynamically updated to provide for a real-time review of the entitlement requests. Such information may be tagged with metadata and stored in a metadata repository.

According to another embodiment, an exception process may be provided for those entitlement requests that are rejected the first time. A user may resubmit the previously rejected entitlement request along with additional information for re-seeking the entitlement permission.

The embodiments of the present invention may provide a real-time, data-aware, content-sensitive, automated, central, accurate, and up-to-date method, apparatus, and system for processing entitlement permissions for users prior to the processing or granting of access. Typically, entitlement permission precedes access and is needed only once, while access permission may be as frequent as the user desires to access a protected system, database, application, or such, or a combination thereof (protected application). According to one embodiment, security classified entitlement rules and roles (ERR) and a metadata repository are also provided and updated for real-time, central, and secure entitlement processing. Many other advantages of the embodiments will be mentioned or discussed here or they will be apparent to one skilled in the art.

In the following description, for the purposes of explanation, numerous specific details are set forth in order to provide a thorough understanding of the present invention. It will be apparent, however, to one skilled in the art that the embodiments of the present invention may be practiced without some of these specific details. In other instances, well-known structures and devices are shown in block diagram form.

The embodiments of the present invention include various steps, which will be described below. The steps may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The embodiments of the present invention may be provided as a computer program product that may include a machine-readable medium, having stored thereon instructions which may be used to program a computer (or other electronic devices) to perform a process according to the present invention. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, a carrier wave or other propagation medium shall be regarded as comprising a machine-readable medium for the purpose of the present specification.

Figure 2:
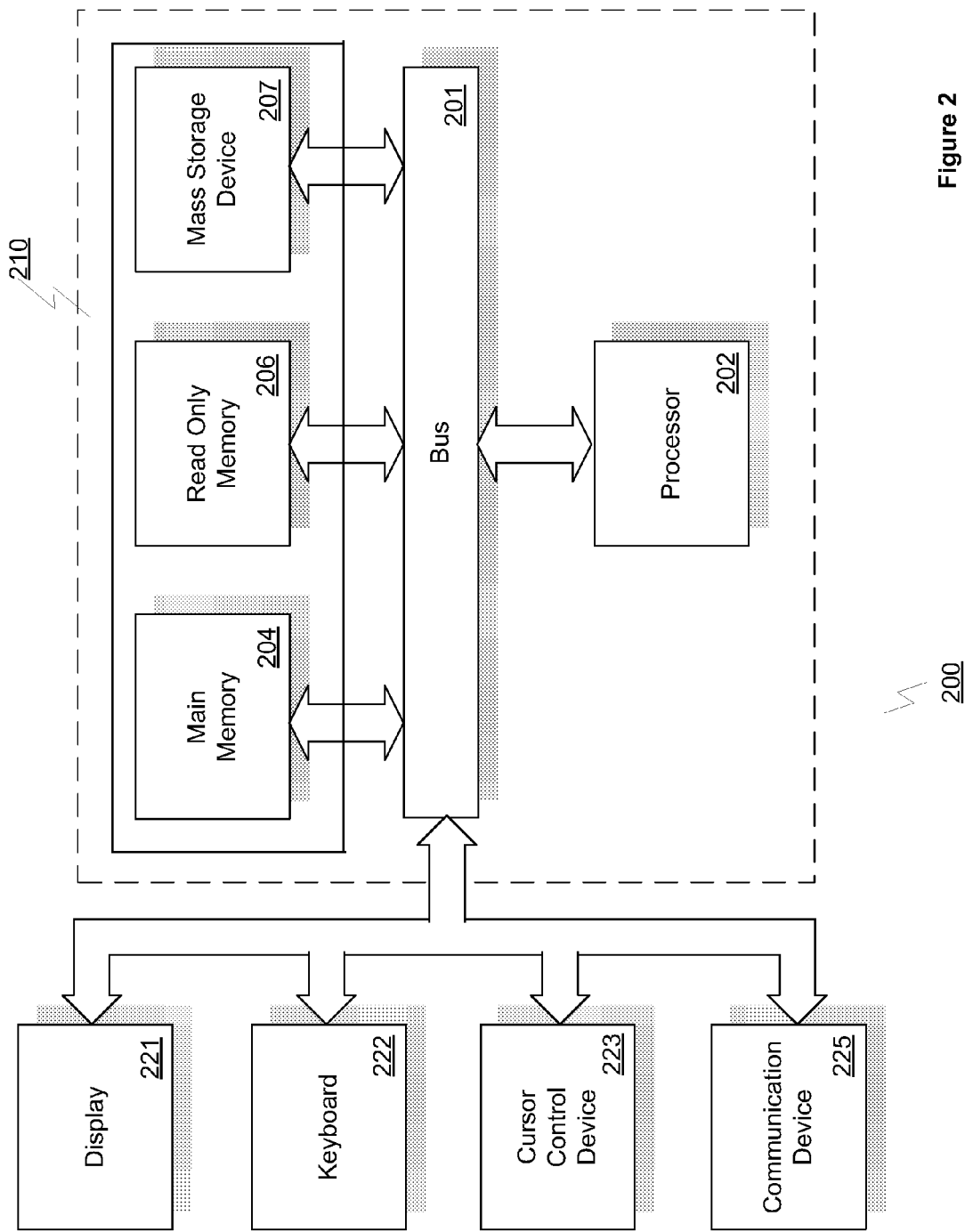
FIG. 2 is a block diagram of a typical computer system upon which one embodiment of the present invention may be implemented.

FIG. 2 is a block diagram of a typical computer system upon which one embodiment of the present invention may be implemented. Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to an end user. Typically, an alphanumeric input device 222, including alphanumeric and other keys, may be coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201. The communication device 225 may include a modem, a network interface card, or other well-known interface devices, such as those used for coupling to Ethernet, token ring, or other types of physical attachment for purposes of providing a communication link to support a local or wide area network, for example. In this manner, the computer system 200 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 200 will vary from implementation to implementation depending upon numerous factors, such as price constraints, performance requirements, technological improvements, and/or other circumstances.

It should be noted that, while the steps described herein may be performed under the control of a programmed processor, such as processor 202, in alternative embodiments, the steps may be fully or partially implemented by any programmable or hard-coded logic, such as Field Programmable Gate Arrays (FPGAs), transistor-transistor logic (TTL) logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited steps are performed by a specific combination of hardware components.

Figure 3:
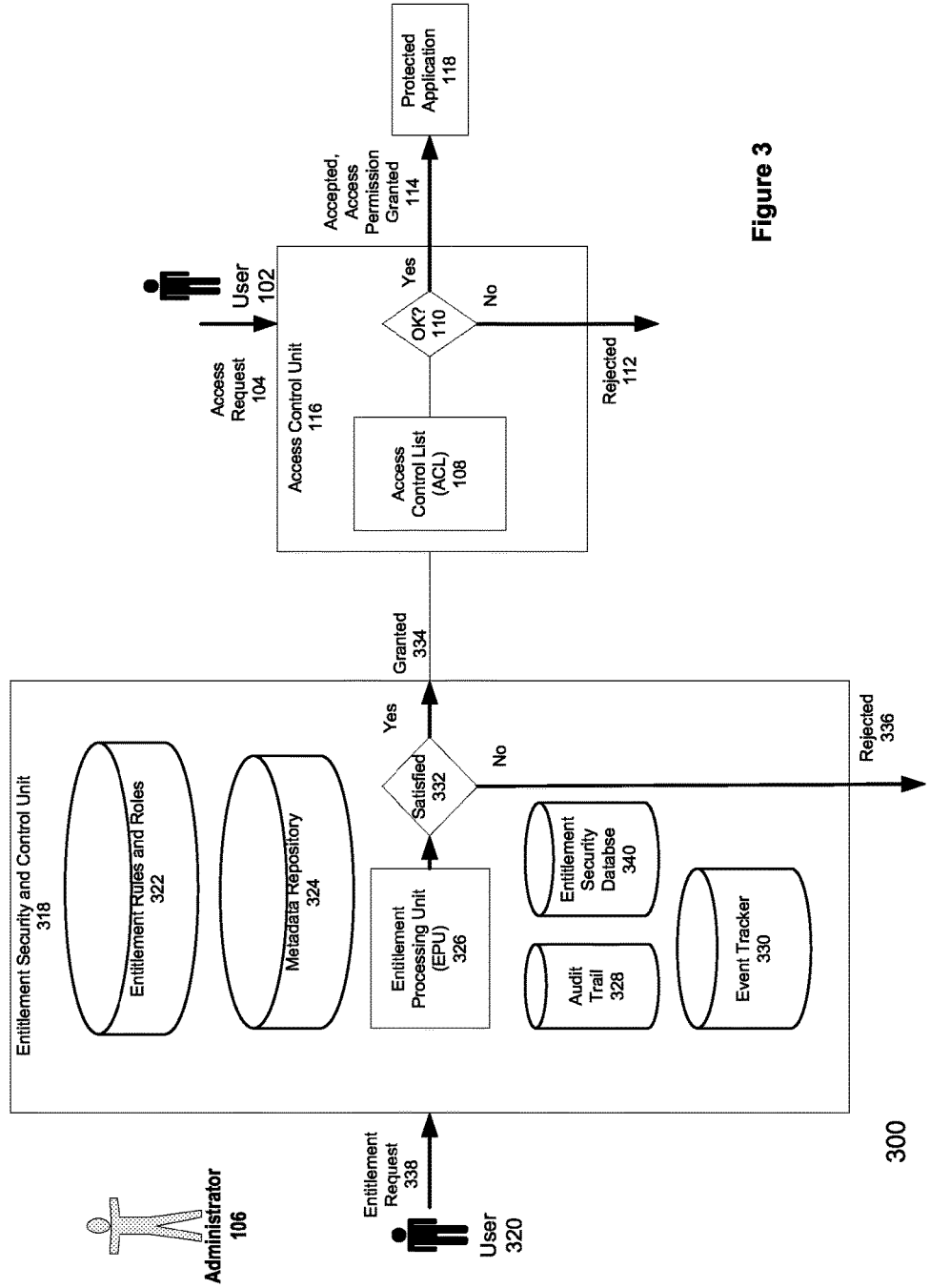
FIG. 3 is a block diagram conceptually illustrating a security and control system, according to one embodiment.

FIG. 3 is a block diagram conceptually illustrating a security and control system, according to one embodiment. As illustrated, according to one embodiment, the security and control system (SCS or system) 300 may comprise an entitlement security and control unit (ESCU) 318 and an access control system (ACS) including an access control unit (ACU) 116. ACU 116 typically relates to access control, i.e., processing of access requests 104 and granting 114 and/or rejecting 112 of such requests. Access is permitting a user 320, 102 to manipulate information within a protected application or database or system (protected application) 118. Stated differently, permission to access is a process of enforcing that only those users 320, 102 with valid accounts or identification may see and/or manipulate the information held within the protected application 118.

ACS comprises an ACU 116 having an access control list (ACL) 108, which may typically hold the names and other information of the users 102, 320, and have accounts and user profiles corresponding to each of the users 102, 320. ACL 108 may comprise tokens, such as a user 102 having access permission to a protected application 118. Stated differently, and to analogize, it would be similar to a person obtaining driver's license to drive a car but not a truck. ACL 108 may be kept locally or remotely, coupled with ACU 116. According to one embodiment, the ESCU 318 may be coupled with one or more of the many traditional access control system-based ACUs 116, such as Access360, RAFC, Windows Active Directory, Discretionary Access Control (DAC), Mandatory Access Control (MAC), Role-Based Access Control (RBAC), which is no more than a pre-packed form of MAC, and Lattice-Based Access Control (LBAC), which is a combination of RBAC and DAC.

According to one embodiment, a user 320, 102 may be of any form of user desired for a particular implementation, and it is to be interpreted broadly. For example, a user 320, 102 may be an individual, an employee, a client, a customer, a contractor, or such or a combination thereof. A user may also be a community or group of users, rather than an individual, based on their qualifications, projects, roles, geographic locations, or such, or a combination thereof.

According to one embodiment, users 102 may be synonymous with users 320 as they may be separated only to distinguish the users 320 seeking entitlement permission from the users 102 seeking access permission. Stated differently, it is user 320 who ultimately may become user 102. Furthermore, a user 102 seeks access permission to access a protected application 118. It is the administrator, or such, who accesses the access control system 116 of the system 300 to grant 114 or reject 112 access permission to the user 102.

As illustrated, the ESCU 318 may comprise one or more of the following: entitlement rules and roles (ERR) 322, metadata repository 324, entitlement processing unit (EPU) 326, audit trail 328, event tracker 330, and entitlement security database (ESD) 340. According to one embodiment, ERR 322 are to make ESCU 318 policy and law-sensitive, by having rules, regulations, and policies of all sorts and levels. For example, ERR 322 may comprise government laws, company rules, and community-based policies regarding privacy, labor, corporate governance, etc. According to one embodiment, ERR 322 are continuously received from various sources and updated to provide a real-time and content-sensitive entitlement security and control process.

According to one embodiment, EPU 326 performs the process of evaluating user entitlement requests by comparing the user information received as part of the user entitlement request with ERR 322. Stated differently, factors such as, characteristics and needs of a user 320, are compared with ERR 322 associated with the role the user 320 is seeking to access. For example, a user 320 may be a media-buyer and/or campaign planner and would like to work in the marketing and/or planning departments. According to one embodiment, if the entitlement requirements or criteria are met, a user entitlement profile may be generated corresponding to each of the users 320 and consequently, the each of the user 320 may be granted entitlement permission. The entitlement permission may refer to an aggregate of data elements that may comprise a single view or account permission matrix in a protected application 118. For example, a department director may see and manipulate every data element in a protected application 118, while the other users 320, 102 may have relatively reduced abilities. Similarly, a user access profile may also be generated corresponding to each of the users 102 before the user 102 may be granted access to the protected application 118. A new user entitlement account, also known as an entitlement role or user role, may be generated and stored for future reference and use. Similarly, a new user access account, also known as an access role or user role, may be generated and stored for future reference and use.

According to one embodiment, entitlement accounts and access accounts refer to allowing a user 320, 102 to access information under certain guidelines and requirements. An account may refer to a particular sub-set of data in a system and may be linked to an entitlement or access role. According to one embodiment, user entitlement and access profiles may include user information (e.g., characteristics, attributes, billing information, position with the organization, address), role preference information indicating types, nature, and characteristics of content the user 320 would like to access and characteristics of content, timing preference, i.e., when the user prefers to view or manipulate content, observational profile information based on automated observation and profile recordation of content consumption behavior of the user 320, 102.

According to one embodiment, content of the protected application 118 may be accessed in an electronically accessible format, existing as a computer file having a particular file format that is compatible, standard, or efficient for the type of content and will be stored in a memory. Digital content may exist as a stream of digital data provided by a digital data generating device (e.g., a digital camera/recorder) or may be provided by an electronically connected source or provider (e.g., a news feed or a stock ticker), or may be provided by another functionally connected entity.

According to one embodiment, the ERR 322, the entitlement accounts and profiles, and the access accounts and profiles may be placed in a metadata repository 324. By tagging metadata, the ERR 322 and profiles are tokenized into objects, and each object calls up a specific routine to review certain changes. ERR 322 and profiles are kept updated with every change. Metadata being data about data, according to one embodiment, provides information about the data, it improves the quality of the data, it defines fields, names, and attribute parameters, etc. According to one embodiment, metadata repository 324 may be a database or system to capture information surrounding data elements. Metadata may include the source of data, update intervals, security classifications, policy and regulatory sensitivities, data retention requirements, etc.

According to one embodiment, audit trail 328 refers to a process for generating a report using the history of each user 320 requesting and receiving the entitlement permission. Audit trail 328 may also be used for auditing ACL 108 to keep track of users 102. For example, auditing of the users 320, 102 may help identify those users 102 who may still have trouble receiving access permission despite receiving entitlement permission or those users 320, 102 whose access may have expired for one reason or another and entitlement permission need be discontinued.

According to one embodiment, audit trail 328 may be coupled with or comprise entitlement security database (ESD) 340. ESD 340 may be used for keeping placing and storing information regarding users 320, 102 seeking, receiving, being denied entitlement permission and/or access permission at any point in time. Stated differently, and going back to the driver's license example with respect to ACL 108, ESD 340 helps preserve to be used, among many other uses, as a trusted reference database maintaining information ranging from the person's name to a copy of the person's application to the fees paid to the final outcome of the application process. Such information is to help the motor vehicle department (MVD) to, for example, authenticate licenses and reissue the ones that might have been lost. Similarly, according to one embodiment, ESD 340, along with audit trail 328, refers to a trusted reference database for, for example, placing, storing, and providing entitlement audit trail and information.

According to one embodiment, ESD 340 may be coupled with and/or communicate with ACL 108 to provide entitlement audit trail and to keep and validate access-related information. For example, information regarding a user 102 re-seeking access for having misplaced the previously issued access permission may be verified and validated by referring and accessing ESD 340. As another example, ESD 340 may inform ACL 108 to remove those users 102 who may still have access, but who no longer have entitlement permission. For example, in case of termination of employment, an employee may continue to have access to her or his email despite having been terminated; however, having ESD 340 may help eliminate such possibility as ACL 108 may instantly be informed of the termination. ESD 340 may not only help secure an organization from terminated employee accessing protected applications, but also may help protect against hackers, as hackers typically have access (as a result of hacking), but do not have entitlement permission. ESD 340 may allow the system 300 to be more security-aware, up-to-date, accurate, and fast when needing information regarding a user 320, 102. According to another embodiment, ESD 340 may not be included in the system 300, and instead the system 300 may have something similar or different, but performing a similar task, as to ESD 340, built within or coupled with the system 300.

According to one embodiment, event tracker 330 refers to watching over all trusted data sources and reviewing of all entitlement requests and permissions upon changes in rules, regulations, or user characteristics. According to one embodiment, an event tracker 330 may watch and review for changes in all of the data and data sources. For example, when data affecting event occurs, an event tracker 330 may track all the entitlement requests 338 currently being considered and entitlement permission previously granted to inform of the event and possibly recommend the EPU 326 for a change in the entitlement process. For example, event tracker 330 may recommend discontinuation or deletion of entitlement permissions of those users 320, 102 who may no longer qualify to have entitlement or access privileges.

According to one embodiment, event tracker 330 may be provided to help perform a real-time check of various system databases, such as Human Resources (HR) database, training database, digital certificate, prior to, during, and after the entitlement process is completed, and tracking continuous update and changes. For example, according to one embodiment, if a user 320 is granted entitlement permission, the event tracker 330 may look for changes in the attributes surrounding the user's 320 status, such as a change in the salary, which probably could be found in the HR database. According to one embodiment, event tracker 330 tracks a change, and the audit trail may show that change as an event occurring and/or occurred. Depending on the characteristics of the event, circumstances, capabilities of the system 300, and such, an event may trigger ESCS to signal the appropriate access control system (ACS) to delete user account or suspend it until further notice.

According to one embodiment, conventional technologies may be used, together with any desirable modifications that will be apparent to those skilled in the art. For example, the system 300 may comprise a conventional processor or machine to execute instructions, a conventional memory to store data, conventional encoder to encode data, a conventional transmitter to transmit data, a conventional receiver to receive data, and a conventional decoder to decode data. Without limitation, data may be converted uncompressed to compressed format, and transmitted over air.

According to one embodiment, the entitlement-related data may be transmitted or transferred from ESCU 318 to ACU 116. Any transmission of data may be secure and done before, after or during the entitlement process. According to one embodiment, the system 300 may comprise a transmission unit to transmit data and a reception unit to receive data. The term "transmission" and "transfer" and related terms are to be used broadly to refer to moving data from one place or system to another and the term "reception" and related terms will be used broadly to refer to accepting the moved data. According to one embodiment, data may be transmitted over one-way or bi-directional communication link. A client-server link, e.g., the Internet, would be typified by a reception unit issuing a request for the data, and the transmission unit transmitting the data in response; while, in a non-client-server link, data may be provided without the request. According to one embodiment, the link between various components of the system 300 may be based on a number of technologies, including satellite dish, fiber optic, coaxial cable, and others. For example, the link may be to broadcast and/or narrowcast.

Figure 4:
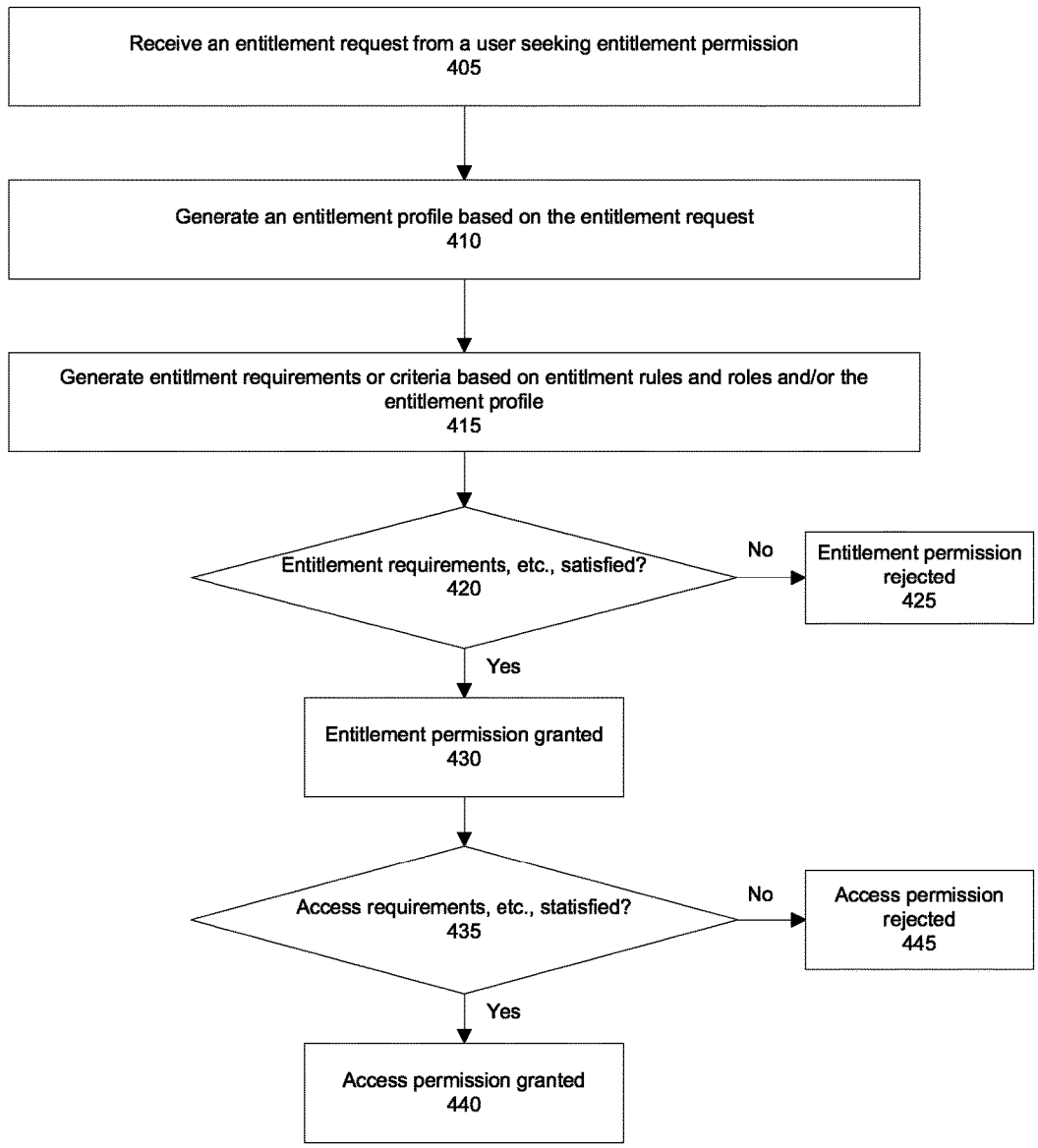
FIG. 4 is a flow diagram conceptually illustrating an entitlement permission process, according to one embodiment.

FIG. 4 is a flow diagram conceptually illustrating an entitlement permission process, according to one embodiment. First, an entitlement request is received from a user at processing block 405. Using the user information contained in the entitlement request, an entitlement profile corresponding to the user may be generated at processing block 410. Entitlement requirements or criteria may be generated based on entitlement rules and roles (ERR) and user profile at processing block 415. Entitlement requirements may contain general requirements that are required for every user and/or specific requirements specific to the user whose entitlement request is being processed. According to one embodiment, neither entitlement profiles nor entitlement requirements may be needed, and instead, the entitlement request may be matched directly against ERR. According to one embodiment, a user must fully satisfy the entitlement requirements for receiving entitlement permission. A full or 100% satisfaction of the entitlement requirements would reflect maximum security; however, an organization may choose to relax that and require a lesser level of satisfaction. ERR, profiles, and requirement may all be dynamically updated.

Whether entitlement permission should be granted is determined at decision block 420. If the match is not satisfied, the user is rejected at processing block 425. Stated differently, the user may not go on to the next step of requesting access permission. If the match is satisfied, i.e., the user meets the entitlement requirements, the user is granted entitlement permission at processing block 430, and the user is qualified or permitted to go on to the next step, which is to request access to a protected application. The entitlement-related information may be securely transmitted to the appropriate access control system (ACS).

Access control unit (ACU) of ACS may determine whether the user should be granted access permission at decision block 435. Determining access permission may be based on an access profile generated by ACU based on the entitlement-related information received earlier and information provided by the user as part of the user access request. If access requirements are satisfied, the user is granted access permission to access a protected application at processing block 440. The frequency of accessing may depend on various factors, such as need, user qualifications, user role, system capabilities, etc. In case of a failure to satisfy the access requirements, the user may not be granted access permission at processing block 445. According to one embodiment, the user may resubmit the access request for reconsideration of access permission.

Figure 5A:
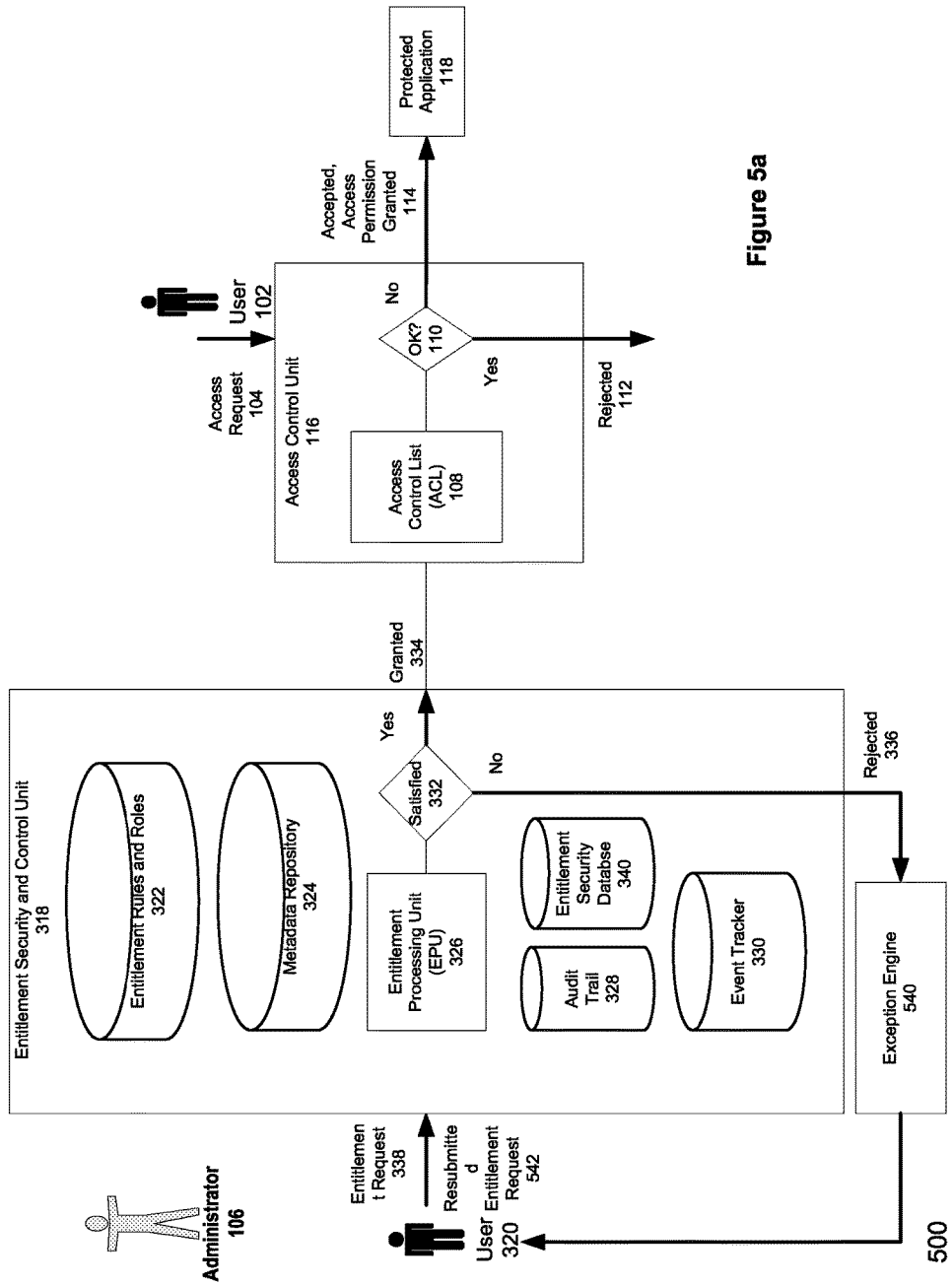
FIG. 5a is a block diagram conceptually illustrating an entitlement security and control system and exception process, according to one embodiment.

FIG. 5a is a block diagram conceptually illustrating an entitlement permission and exception process, according to one embodiment. According to one embodiment, an exception process may be established for those users 320 who were denied entitlement permission upon submitting their first entitlement request 338. The exception process may include an exception engine 540 to determine whether the user 320 qualifies for an exception. If the user 320 is not qualified, the user 320 may be rejected. However, if the user 320 is qualified, the user 320 may be informed of the exception opportunity allowing the user 320 to resubmit the entitlement request 542 along with additional information that may help the user 320 obtain entitlement permission this time around. To seek exception, a user 320 may resubmit the entitlement request 542 and additional information for re-seeking entitlement permission. According to one embodiment, the exception process may be limited to a certain number of times or be perpetual, depending on several factors, such as system administration, system capabilities, users, protected application, and/or other relevant factors.

Figure 5B:
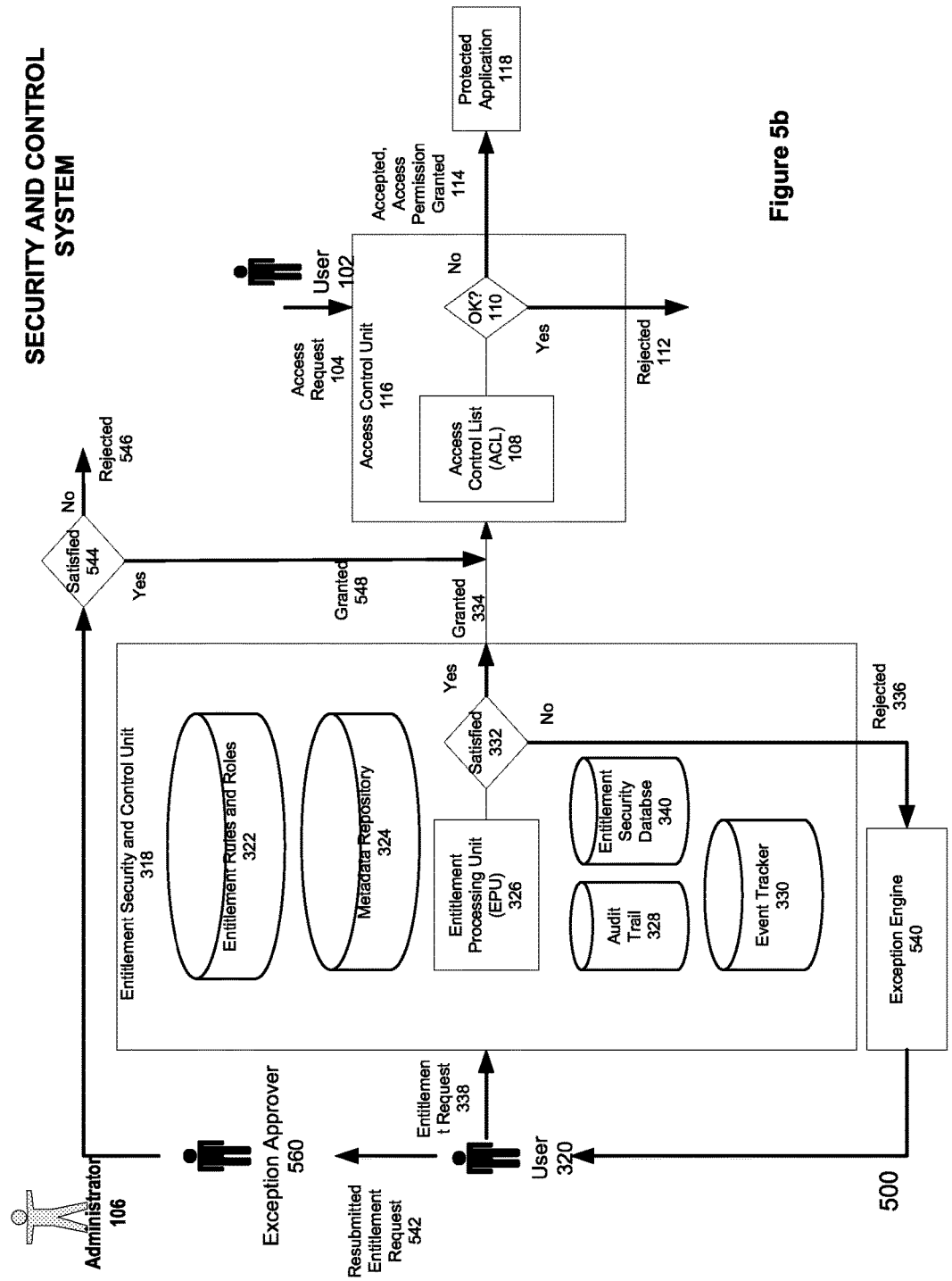
FIG. 5b is a block diagram conceptually illustrating an entitlement security and control system and exception process, according to one embodiment.

FIG. 5b is a block diagram conceptually illustrating an entitlement permission and exception process, according to one embodiment. According to one embodiment, an exception process may be established for those users 320 who were denied entitlement permission upon submitting their first entitlement request 338. The exception process may include an exception engine 540 to determine whether the user 320 qualifies for an exception. If the user 320 is not qualified, the user 320 may be rejected. However, if the user 320 is qualified, the user 320 may be informed of the exception opportunity allowing the user 320 to resubmit the entitlement request 542 along with additional information that may help the user 320 obtain entitlement permission this time around.

According to one embodiment, an administrator 106 may be an external security person or group, or someone within the organization, or a combination thereof 338. Typically, an administrator 106 is a trusted individual, a specialist, a data approver, or such, who understands and is likely to be an expert of the entitlement process. Stated differently, an authorized person is trusted with analyzing security classification of the aggregate data in an entitlement role or user role, and who understands the user requirements necessary to entitle a user 320 to have a user or entitlement role. If the user 320 entitlement request 542 does not satisfy the given entitlement requirements, the user 320 may be rejected 546; however, if the entitlement request 542 is approved, the user 320 may be granted entitlement permission. According to one embodiment, security classification may depend on entitlement rules and roles 322, entitlement profiles, entitlement request 338, 542, and even predefined criteria generated by an administrator or other authorized personnel. For example, some information may be available to anyone, while certain information may be highly restricted. Furthermore, with regard to the aggregate data, when more than one data element is combined to produce a view, report, screen, or ability to sort and search, the combined capability for access may have the potential to increase the security classification. For example, combining billings, bookings, and backlogs may create "inside information" which may invoke specific policy requirements for the user 320, 102 who is requesting entitlement and access.

According to one embodiment, after determining the entitlement security requirements for each user 320, an authorized person, such as an exception approver 560 then turns to determining the exception status of those users 320 whose entitlements requests did not meet the entitlement requirements. If the entitlement requirements are not satisfied, the user 320 may not be granted entitlement permission 544, and if the entitlement requirements are satisfied, the user 320 may receive entitlement permission 546. According to one embodiment, an exception approver 560 may be the one who understands and is an expert in data security requirements. Furthermore, the system 500 or ESCU 318 may comprise a list of exception approvers, and in case of a change in the status of an exception approver 560, event tracker 330 may inform the supervisor of the exception approver to find a replacement or such. Maintenance of role management allows for scalability that improves even an un-automated access control system.

Figure 6A:
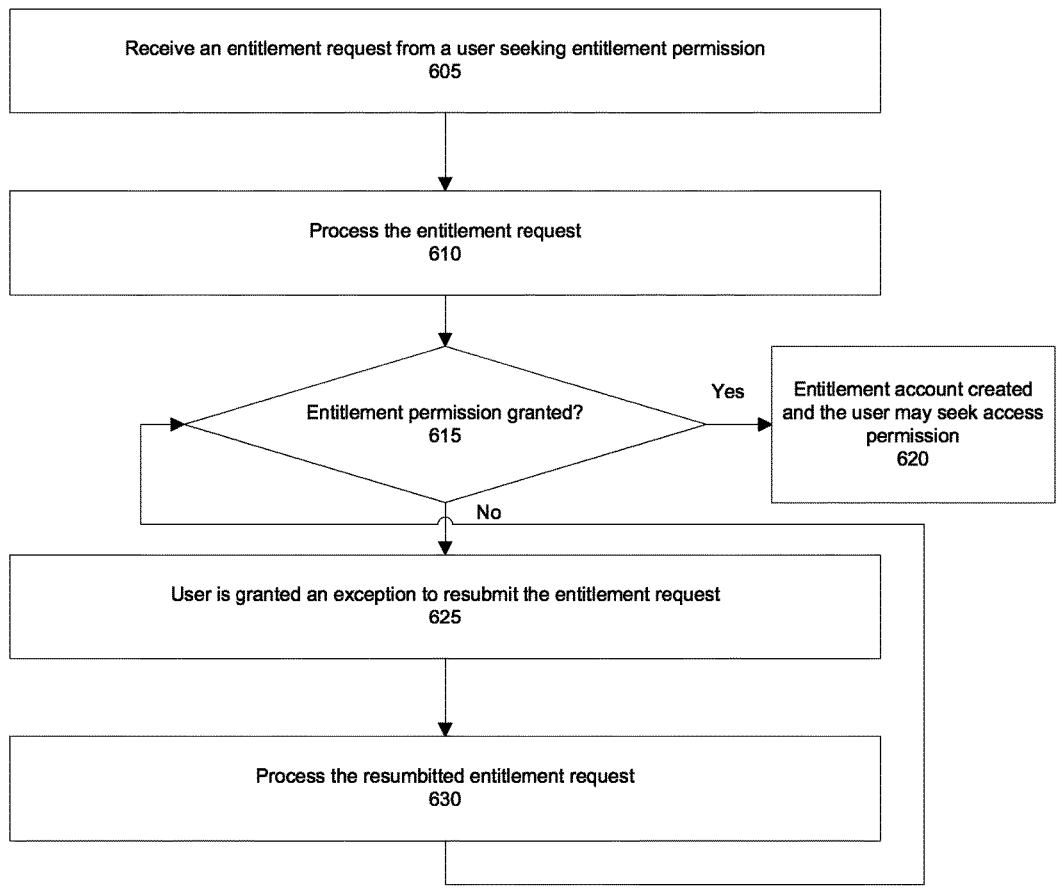
FIG. 6a is a flow diagram conceptually illustrating an entitlement permission and exception process, according to one embodiment.

FIG. 6a is a flow diagram conceptually illustrating an entitlement permission and exception process, according to one embodiment. Entitlement requests are received by the entitlement security and control unit (ESCU) within a security and control system (system) from users seeking entitlement permission to ultimately gain access to a protected application at processing block 605. Entitlement requests are processed in real-time by reviewing them against entitlement rules and roles (ERR) at processing bock 610. At decision block 615, it is determined whether entitlement permissions be granted. If granted, users receiving entitlement permission are allowed to seek access permission to access the protected application at processing block 620. However, if rejected, users not receiving entitlement permission may be granted the exception option. Under an exception process, according to one embodiment, users may be allowed to resubmit the entitlement request along with additional information at processing block 625. Resubmitted entitlement requests are reconsidered and reprocessed in light of the newly submitted information at processing block 630.

At decision block 615, it is determined whether resubmitted entitlement requests be approved. If approved, users are allowed to seek access permission at processing block

620. If rejected again, according to one embodiment, the users are granted another exception at processing block 615. The frequency of exception process may depend on entitlement profiles, ERR, organization, system capabilities, etc., or a combination thereof. According to another embodiment, users may be permanently rejected or rejected for a pre-defined period of time depending on factors, such as user entitlement profile, ERR, organization, system capabilities, etc., or a combination thereof.

Figure 6B:
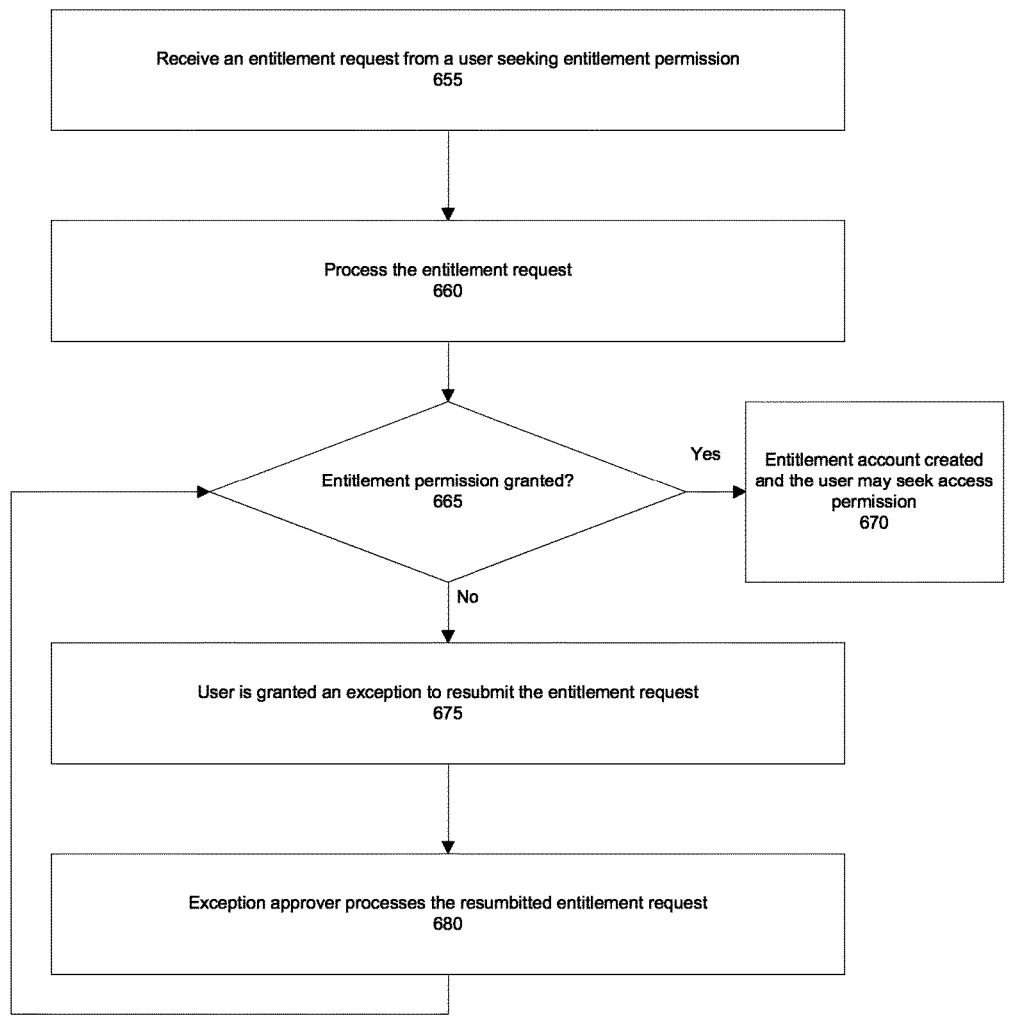
FIG. 6b is a flow diagram conceptually illustrating an entitlement permission and exception process, according to one embodiment.

FIG. 6b is a flow diagram conceptually illustrating an entitlement permission and exception process, according to one embodiment. User entitlement requests are received by the entitlement security and control unit (ESCU) within a security and control system (system) from users seeking entitlement permission at processing block 655. Entitlement requests are processed in real-time by reviewing the entitlement requests against entitlement rules and roles (ERR) at processing bock 660. At decision block 665, it is determined whether entitlement permissions be granted. If granted, users receiving entitlement permission are allowed to seek access permission at processing block 670. However, if rejected, users may be granted an exception. Under the exception process, users may be allowed to resubmit entitlement requests along with additional information at processing block 675. Resubmitted entitlement requests may be manually reconsidered and reprocessed by an authorized individual, such as an exception approver, in light of the newly submitted information at processing block 680.

At decision block 665, it is determined whether resubmitted entitlement requests be approved. If approved, users are allowed to seek access permission at processing block 680. If rejected again, according to one embodiment, users are granted another exception at processing block 675. The frequency of exception process may depend on user entitlement profiles, ERR, organization, system capabilities, etc., or a combination thereof.

Figure 7:
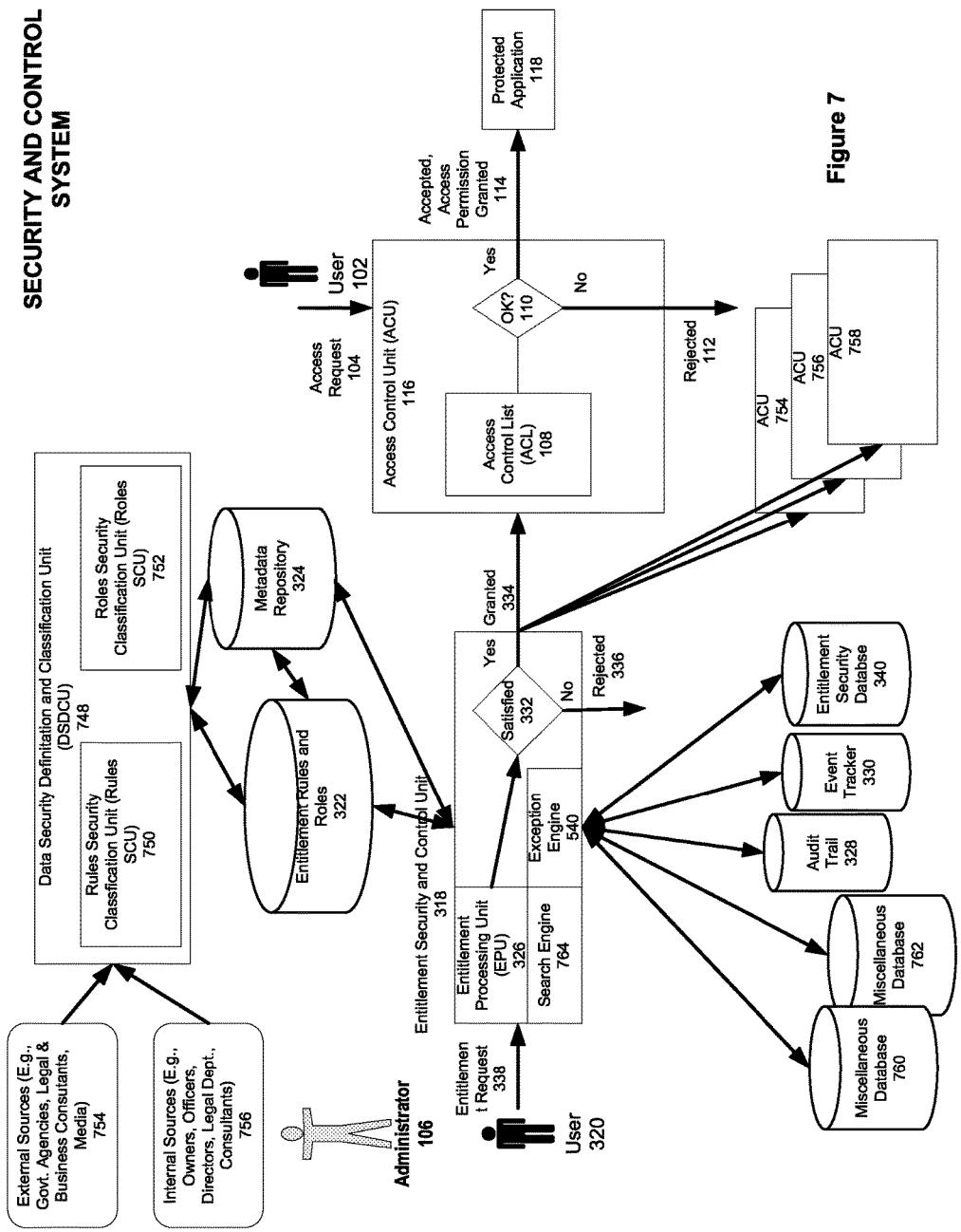
FIG. 7 is a block diagram conceptually illustrating an entitlement security and control system, according to one embodiment.

FIG. 7 is a block diagram conceptually illustrating an entitlement security and control system, according to one embodiment. According to one embodiment, entitlement security and control system (ESCS) 318 may acquire data, such as entitlement rules and roles 322, through a data security definition and classification process (classification process). ESCS may be coupled or integrated, physically and/or logically, with a data security definition and classification unit (DSDCU) 748. According to one embodiment, DSDCU 748 may comprise rules security classification unit (Rules SCU) 750 for security classification of data or data element comprising rules, and a roles security classification unit (Roles SCU) 752 for security classification of roles. According to one embodiment, classification process refers to receiving sensitive data, including government and organization rules, regulations, laws, policies, and other relevant data from various sources and classifying of such data for ultimately generating entitlement rules roles (ERR) 322. As discussed previously, ERR 322 may be used to generate general entitlement requirements or criteria and specific entitlement requirements or criteria corresponding to each of the users 320 requesting entitlement permission.

According to one embodiment, various sources may include organization owners, shareholders, directors, department managers, external and internal business and legal counselors, federal, state, and local government and law enforcement agencies, new media and publications, legal media and publications, business media and publications, etc., or a combination thereof. Data from such sources may be consistently received and updated for providing a real-time, secure, content-aware, and accurate processing of entitlement requests. Classification process, according to one embodiment, refers, generally, to a process for generating data security classification of each of the data elements that makes up ERR 322 and for further determining whether aggregate of the data elements in entitlement roles have additive security sensitivity. Stated differently, classification process refers to a process for associating or appending role security classifications and sensitivities with all appropriate policies and regulations, capturing the entitlement requirements and ERR 322 of the data stewards, and enforcing their compliance before an entitlement account can be generated. As stated previously, classification process may include the following two processes: (1) security classification of data or data elements comprising rules and regulations and (2) security classification of roles based on security-classified rules and possibly, but not necessarily, other factors. According to one embodiment, data derived from both of the above-mentioned processes may be collectively referred to as ERR 322. Stated differently, ERR 322 comprises security-classified entitlement rules, regulations, policies, and security classified entitlement roles, or a combination thereof.

According to one embodiment, security classification of the data or data elements comprising rules may be based on various factors, such as data characteristics, data relevance, data confidentiality, etc. Depending on their content, various data elements may have different security classifications. For example, some information may be available to any user 320, 102 who may have access permission, while other information may be highly restricted and viewable only to a certain group of users 320, 102. Security classification of data and data elements may be determined in a number of ways, and sometimes these requirements may be additive and may apply simultaneously. Data typically refers to the quantitative value of information. For example, in a spreadsheet containing employee ages, the column having the numbers representing years would be classified as the data. According to one embodiment, data may refer to a rule or a set of rules received from one or more internal and/or external sources. The top cell with definition may be classified as data definition. According to one embodiment, data element refers to information element in its entirety. For example, in a spreadsheet, a data element would be the equivalent of a single column of information. There may, however, be a multiple instantiations of a value, but each instantiation would reflect the same definition. Data elements may include data values and data definitions. Security classification of data or data elements may refer to classifying data and data elements as entitlement rules as they may ultimately be used for allowing real-time, secure, content-aware, security-aware, automated, and accurate processing of entitlement requests.

According to one embodiment, security classification may relate to confidentiality of data element as determined by government rules and/or organization rules and policies. If confidential, the type of confidentially may be determined, such as top secret, secret, restricted secret, or confidential, by determining and defining the primary content of the data as compared with the rest of the data, rules and policies. Similarly, policy sensitivity of data may be determined, such as controlled country, private, or insider. An appropriate action may be determined and taken. According to one embodiment, confidentiality of aggregate data or information may be determined as it may relate to users 320, 102 or to entitlement roles.

According to one embodiment, security classification of roles refers to classification of entitlement roles based on entitlement rules and possibly, but not necessarily other factors, such as entitlement requests, entitlement profiles, predetermined criteria, or a combination thereof. According to one embodiment, entitlement roles may be mutually exclusive for policy or other reasons. For example, the mutual exclusivity of an entitlement role that relates to and is limited to writing checks using a checking account and an entitlement role that related to and is limited to auditing or reconciling of the checking account. Some of these situations may simply be defined by accepted accounting principles. According to one embodiment, a user entitlement role refers to an aggregate of data elements that comprise a single view or account permission matrix in a protected application, system, or database (protected application). For example, the entitlement role of an administrator, such as 106 or data expert, would be to see and manipulate every data element in a protected application. Other users, such as 320, 102, however, may have entitlement roles with relatively reduced abilities. The nature or characteristics or an entitlement role may depend on the work-related status and personal status of the user 320 and rules and policies. Work-related status may include position within the organization, geographic region, employment status, grade, workgroup, etc., or a combination thereof. Personal status may include age, credit rating, experience, education, etc., or a combination thereof. The process of security classification of roles refers to classifying general entitlement roles and, if desired, specific entitlement roles corresponding to each of the users 320 for allowing a real-time, secure, content-aware, security-aware, automated, and accurate processing of entitlement requests.

According to one embodiment, DSDCU 748 may be coupled with a metadata repository 324 for capturing classified data from both the security classification of rules and security classification of roles. Stated differently, metadata is tagged to the data comprising ERR 322, and metadata repository 324 not only may have the actual data, but also data description, and security classification associated or appended with the data. According to one embodiment, having data, data description, data classification, and metadata tagged with the data and data classification, in a metadata repository 324 may provide valuable information to the authorized individuals, such as administrators 106, developers, data experts, data approvers, and such, or a combination thereof, for example, regarding sensitivity, security, content, and value of the data, so that a better protection may be implement and enforced. Having a metadata repository 324 may provide for having a description of the data element security sensitivity and the collective role object sensitivity and related rules as placed in the metadata repository 324 allowing a developer to seek and to use the data with the advantage of being aware of its security descriptions and entitlement requirements. Stated differently, having a metadata repository 324 allows data security classifications and policy sensitivity to be referenced by the authorized individuals when, for example, they need to manually approve an exception.

According to one embodiment, an authorized individual may consistently review the defined metadata tags to stay updated with the type, classification, and nature of data in use and may review such information against changing organizational policies and governmental rules to, for example, keep the data updated. According to one embodiment, ERR 322 and other data may be retrieved from a metadata repository 324, as needed or desired, for processing of entitlement requests or other reasons. According to one embodiment, titles, such as administrator 106, data approver, exception approver 560, developers, and authorized person may be used interchangeably, as one individual may have all the responsibilities, or they may all be completely entirely different individuals with separate responsibilities.

According to one embodiment, individual users 320, 102 may have multiple entitlement permissions. Each of the entitlement permissions may be associated with an object in the metadata repository 324 that may be composed of names and descriptions of data elements. Having such capability, along with the sorting of data capability, may help inform a data owner, or such, of all the users 320, 102 having entitlement permissions and any other combination of all the related information.

According to one embodiment, reference databases in addition to metadata repository 324 may be provided. For example, audit trail 328, event tracker 330, other miscellaneous databases 760-762, such as Human Resources (HR) database, training database may be provided for additional references, placement, storage, logging, or a combination thereof, depending on circumstances, needs, requirements, system capabilities, or a combination thereof. Furthermore, according to one embodiment, a search engine 764 may be provided to help provide real-time searching capabilities. For example, a search engine 764 may search for those users who have written bad checks in the last five years. Search engine 764 may be designed or implemented to provide customized details and formats. Search engine 764, and other databases, such as, 322, 324, 328, 330, 760, 762, may be logically and/or physically coupled with one another in any combination, and may be logically and/or physically coupled with and/or within the system 700 or any other system.

According to one embodiment, a system 700 may have multiple ACUs, such as 116, 754-758, which may be physically and/or logically integrated or coupled with the entitlement security and control unit (ESCU) 318. Such integration may involve servers, applications, systems, databases, and various other apparatus and/or software, as desired. For example, any of the ACUs 116, 754-758 may reside remotely from the ESCU 318, and may be linked wireless or coupled in some other way. System 700 may serve and/or have multiple platforms, such as VAX, Mainframe, PC, Active Directory, Novell, MAC, UNIX, LINUX, etc., as well as standalone machines. According to one embodiment, each of the ACUs 116, 754-758 may be acquired to serve different users 320, 102, same users 320, 102, or a combination thereof. Some to the ACUs 116, 754-758 may be acquired to serve as floaters when one or more of the ACUs 116, 754-758 fail to perform.

As with regard to FIG. 3, according to one embodiment, user 102 may be synonymous with user 320, they may, however, be separated only to distinguish the user 320 seeking entitlement permission from the user 102 seeking access permission. Stated differently, it is user 320 who may ultimately becomes user 102. Furthermore, users 102 seeking access permission seek to access a protected application. It is the administrator 106 or such, however, who accesses the ACS of the system 700 to grant or reject access permission to users 102.

According to one embodiment, any combination of the various components of the system 700 is contemplated, and may be used based on a given circumstances and/or predetermined criteria. It is also contemplated that not all the components are necessary, and several other components may be added, as it will be obvious to the one familiar with the art. For example, various components and units, such as audit trail 328 and event tracker 330 may completely be eliminated, and various components and units, such as ACUs 116, 754-758 may be added or reduced in number, or only manual entitlement process and access process system be provided for all or some users 320, 102, depending on given circumstance and/or predetermined criteria.

Figure 8:
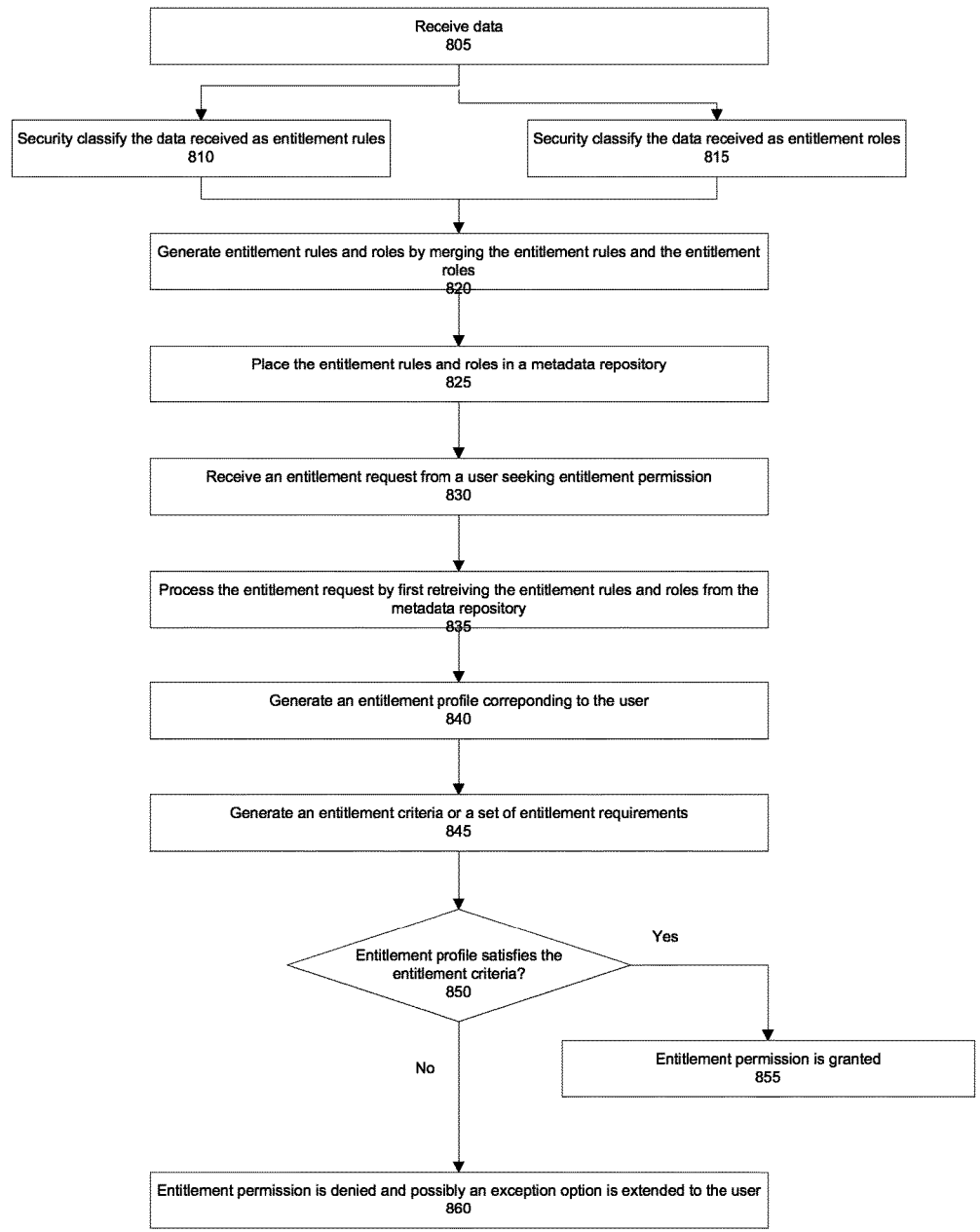
FIG. 8 is a flow diagram conceptually illustrating an entitlement permission process, according to one embodiment.

FIG. 8 is a flow diagram conceptually illustrating an entitlement permission process, according to one embodiment. First, receiving data, including rules, regulations, laws, policies, etc., from a variety of sources at processing block 805. Security classifying the data received as entitlement rules using a variety of factors, such as confidentiality, importance, characteristics, relevance, etc., at processing block 810. According to one embodiment, data elements are security classified as rules. At processing block 815, security classifying the data received as entitlement roles based on security classified rules and, if necessary or desired, other factors, such as entitlement requests, entitlement profiles, predetermined criteria, or a combination thereof. According to one embodiment, the entitlement rules and the entitlement roles merge as entitlement rules and roles (ERR) at processing block 820. At processing block 825, the entitlement rules and roles are placed in a metadata repository. At processing block 830, receiving an entitlement request from a user seeking entitlement permission.

According to one embodiment, processing the entitlement request by, first, retrieving ERR from metadata repository based on the information contained in the entitlement request at processing block 835. Then, according to one embodiment, generating an entitlement profile corresponding to the user using the information contained in the entitlement request and retrieved from the metadata repository at processing block 840. At processing block 845, entitlement requirements are generated also based on the information contained in the entitlement request and retrieved from the metadata repository. According to one embodiment, entitlement requirements may contain general requirements and criteria for all users and, if necessary or desired, requirements and criteria specific to the user whose entitlement request is being processed.

At decision block 850, according to one embodiment, using the entitlement profile and entitlement requirements generated earlier, it is determined whether the user should be granted entitlement permission. If the entitlement profile satisfies the entitlement requirements, the user is granted entitlement permission and an opportunity to request access permission to a protected application at processing block 855. According to one embodiment, entitlement request is matched against ERR, and the user is granted entitlement permission when the entitlement request satisfies ERR. If the user fails to satisfy the entitlement requirements or ERR, the entitlement request is rejected, at processing block 860, and if exception is available, the user is provided the exception, i.e., to resubmit the entitlement request with additional information.

According to one embodiment, the inclusion of additional information may be optional or mandatory, or partially optional and mandatory, depending on various factors, such as type of system or database or application, type of user, type of organization, time, geography, or a combination thereof. According to one embodiment, for maximum security, a system or organization may require a 100% satisfaction of entitlement requirements. In contrast, a system or organization may require a lesser standard of satisfaction; nevertheless, according to one embodiment, provide users the exception option to resubmit entitlement requests.

What is claimed is:

1. A method for automatically managing security in a computer system, the method comprising:
    in response to submission of an electronic entitlement request that requests permission for a computer user to be allowed to access a computer resource of the computer system, automatically determining whether the entitlement request satisfies one or more predetermined entitlement rules for the computer resource;
    automatically granting an entitlement permission for the computer user for the computer resource, in response to a determination that the entitlement request for the computer user satisfies the one or more predetermined entitlement rules for the computer resource;
    automatically generating an audit trail comprising information relating to the computer user receiving the entitlement permission;
    tracking a change to one or more user characteristics of the computer user in one or more data sources; and
    automatically updating the audit trail to reflect the change to the one or more data sources.

2. A method according to claim 1, wherein the operation of automatically determining whether the entitlement request satisfies one or more predetermined entitlement rules for the computer resource comprises:
    automatically determining, in real-time, whether the entitlement request satisfies the one or more predetermined entitlement rules.

3. A method according to claim 2, further comprising:
    rejecting a first entitlement request for the computer user in response to a determination that the first entitlement request does not satisfy at least one predetermined entitlement rule for the computer resources; and
    after rejecting the first entitlement request, processing a resubmitted entitlement request for the first user.

4. A method according to claim 3, wherein the operation of processing the resubmitted entitlement request comprises determining whether the resubmitted entitlement request should be granted, based on input from a human administrator.

5. A method according to claim 2, wherein:
    the operation automatically granting the entitlement permission is performed in real-time; and
    wherein the operation of granting the entitlement permission enables the computer user to access the computer resource.

6. A method according to claim 1, wherein the operation of granting the entitlement permission enables the computer user to access the computer resource.

7. At least one non-transitory machine-readable storage medium having instructions stored thereon which, when executed by a computer system, enable the computer system to:
    in response to submission of an electronic entitlement request that requests permission for a computer user to be allowed to access a computer resource of the computer system, automatically determine whether the entitlement request satisfies one or more predetermined entitlement rules for the computer resource;
    automatically grant an entitlement permission for the computer user for the computer resource, in response to a determination that the entitlement request for the computer user satisfies the one or more predetermined entitlement rules for the computer resource;
    generate an audit trail comprising information relating to the computer user receiving the entitlement permission;

track a change to one or more user characteristics of the computer user in one or more data sources; and automatically update the audit trail to reflect the change to the one or more data sources.

8. At least one machine-readable storage medium according to claim 7, wherein the instructions enable the computer system to automatically determine, in real-time, whether the entitlement request satisfies the one or more predetermined entitlement rules.

9. At least one machine-readable storage medium according to claim 8, wherein:

the instructions enable the computer system to reject a first entitlement request for the computer user in response to a determination that the first entitlement request does not satisfy at least one predetermined entitlement rule for the computer resource; and the instructions enable the computer system to process a resubmitted entitlement request for the first user after the first entitlement request has been rejected.

10. At least one machine-readable storage medium according to claim 9, wherein:

the instructions enable the computer system to determine whether the resubmitted entitlement request should be granted, based on input from a human administrator.

11. At least one machine-readable storage medium according to claim 8, wherein:

the instructions enable the computer system to automatically grant the entitlement permission in real-time; and the granted entitlement permission enables the computer user to access the computer resource.

12. At least one machine-readable storage medium according to claim 7, wherein the operation of granting the entitlement permission enables the computer user to access the computer resource.

13. A computer system comprising:

at least one processor; and at least one non-transitory machine-readable storage medium responsive to the processor, the machine-readable storage medium having instructions stored thereon which, when executed, enable the computer system to:

in response to submission of an electronic entitlement request that requests permission for a computer user to be allowed to access a computer resource of the computer system, automatically determine whether the entitlement request satisfies one or more predetermined entitlement rules for the computer resource;

automatically grant an entitlement permission for the computer user for the computer resource, in response to a determination that the entitlement request for the computer user satisfies the one or more predetermined entitlement rules for the computer resource;

generate an audit trail comprising information relating to the computer user receiving the entitlement permission;

track a change to one or more user characteristics of the computer user in one or more data sources; and automatically update the audit trail to reflect the change to the one or more data sources.

14. A computer system according to claim 13, wherein the instructions enable the computer system to automatically determine, in real-time, whether the entitlement request satisfies the one or more predetermined entitlement rules.

15. A computer system according to claim 14, wherein:

the instructions enable the computer system to reject a first entitlement request for the computer user in response to a determination that the first entitlement request does not satisfy at least one predetermined entitlement rule for the computer resource; and the instructions enable the computer system to process a resubmitted entitlement request for the first user after the first entitlement request has been rejected.

16. A computer system according to claim 15, wherein:

the instructions enable the computer system to determine whether the resubmitted entitlement request should be granted, based on input from a human administrator.

17. A computer system according to claim 14, wherein:

the instructions enable the computer system to automatically grant the entitlement permission in real-time; and the granted entitlement permission enables the computer user to access the computer resource.

18. A computer system according to claim 13, wherein the granted entitlement permission enables the computer user to access the computer resource.

* * * * *